(12) United States Patent
Ueda (10) Patent No.: US 8,472,843 B2
(45) Date of Patent: Jun. 25, 2013

(54) COMPOUND APPARATUS

(75) Inventor: Hidenori Ueda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 731 days.

(21) Appl. No.: 12/630,865

(22) Filed: Dec. 4, 2009

(65) Prior Publication Data

US 2010/0141977 A1    Jun. 10, 2010

(30) Foreign Application Priority Data

Dec. 4, 2008 (JP) .................................. 2008-309365

(51) Int. Cl.
*G03G 15/00* (2006.01)
*G03G 21/00* (2006.01)

(52) U.S. Cl.
USPC ............................ 399/125; 399/107; 399/124

(58) Field of Classification Search
USPC .................. 399/107, 110, 124, 125; 358/474, 358/494, 496, 497
See application file for complete search history.

(56) References Cited

U.S. PATENT DOCUMENTS

| | | | |
|---|---|---|---|
| 6,714,756 B2* | 3/2004 | Iimuro ....................... | 399/107 X |
| 7,272,338 B2* | 9/2007 | Karasawa et al. ............. | 399/107 |
| 7,773,267 B2* | 8/2010 | Kim et al. .................. | 358/474 X |
| 7,804,628 B2* | 9/2010 | Hashimoto et al. ............ | 358/494 |
| 2006/0051125 A1* | 3/2006 | Nakayama ..................... | 399/110 |
| 2006/0182463 A1* | 8/2006 | Imada et al. .................. | 399/107 |

FOREIGN PATENT DOCUMENTS

JP    2008-152050 A    7/2008

* cited by examiner

*Primary Examiner* — Sophia S Chen
(74) *Attorney, Agent, or Firm* — Panitch Schwarze Belisario & Nadel LLP (57) ABSTRACT

A compound apparatus is supplied in which the manuscript reading apparatus easily moves and rotates. The compound apparatus includes a printer section for forming an image onto record paper and a scanner section that is furnished in the printer section for reading out a manuscript. The printer section includes a box body that has an open mouth on the top and an image forming mechanism section that is furnished in the box body, and the scanner section is capable of rotating between a position closing the open mouth and a position opening the open mouth through a rotation fulcrum axis that is furnished on the left end part of the printer section and that extends to the front and back directions.

22 Claims, 11 Drawing Sheets

COMPOUND APPARATUS

BACKGROUND OF THE INVENTION

The invention relates to a compound apparatus comprising an image forming apparatus and a manuscript reading apparatus.

In a former compound apparatus comprising an image forming apparatus and a manuscript reading apparatus, the manuscript reading apparatus is furnished to the above of the image forming apparatus, and in the case to perform an inside maintenance and an expendable article change of the image forming apparatus, the upper part of the image forming apparatus is opened through driving the manuscript reading apparatus rotate backward with respect to the image forming apparatus (for example, referring to patent document 1).

Patent document 1: Japan patent publication of No. 2008-152050

However, in the apparatus described by the patent document 1, in order to drive the manuscript reading apparatus rotate backward, in the case that a user uses a wheelchair and the like, the rotating movement is difficult.

BRIEF SUMMARY OF THE INVENTION

It is, therefore, an object of the invention to provide a compound apparatus that can solve the above problem. That is, a compound apparatus is supplied in which the manuscript reading apparatus easily moves and rotates.

An aspect of the invention is to provide a compound apparatus that comprises an image forming apparatus for forming an image onto a record medium and a manuscript reading apparatus that is furnished in the image forming apparatus for reading out a manuscript, wherein the image forming apparatus comprises a box body section that has an open mouth on the top; and an image forming mechanism section that is furnished in the box body section, and the manuscript reading apparatus is supported capable of rotating between a position that blocks the open mouth and a position that opens the open mouth through a rotation fulcrum axis that is furnished on the left end part or the right end part of the image forming apparatus and that extends to the front and back directions.

According to such structure, even if the manuscript reading apparatus is driven to rotate, the position of depth direction with respect to a user is not changed, therefore the manuscript reading apparatus easily moves and rotates.

Further, it is desirable that the rotation fulcrum axis of the manuscript reading apparatus is furnished in the outside of the open mouth.

According to such structure, in conditions of opening the open mouth by driving the manuscript reading apparatus rotate, it becomes easy to perform the inside maintenance and the expendable article change of the image forming mechanism section around the rotation fulcrum axis of the open mouth.

Further, it is desirable that a control foundation board that controls an electric power source unit for supplying electric power to the image forming mechanism section, a driving motor for driving the image forming mechanism section and the image forming mechanism section is furnished below the rotation fulcrum axis.

According to such structure, it is possible to put space of the width direction to practical use effectively.

Further, it is desirable that the image forming apparatus further comprises a cover capable of rotating between a position that blocks the open mouth of the box body section and a position that opens the open mouth of the box body section through a rotation fulcrum axis that is furnished on the rear of the box body section and that extends to left and right directions.

According to such structure, it is possible to protect the image forming mechanism section through the cover.

Furthermore, it is desirable that the manuscript reading apparatus comprises a manuscript reading section that is supported capable of rotating with respect to the image forming apparatus and that has a manuscript loading surface for reading out the manuscript, and a manuscript holding section that is furnished on the manuscript reading section and that holds the manuscript loaded on the manuscript loading surface down, wherein the manuscript holding section is supported capable of rotating between a position that holds the manuscript down by covering the manuscript loading surface and a position that opens the manuscript loading surface through a rotation fulcrum axis that is furnished on the right end part or the left end part of the manuscript reading section and that extends to the front and back directions, and the rotation fulcrum axis of the manuscript reading section and the rotation fulcrum axis of the manuscript holding section are respectively furnished opposite sides of the left and right.

According to such structure, it is possible to open the manuscript reading apparatus with preventing that the manuscript holding section is unnecessarily opened.

The effect of the present invention:

According to the present invention, it is possible to supply a compound apparatus in which the manuscript reading apparatus easily moves and rotates.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Embodiments of the invention will be described in detail hereinbelow with reference to the drawings.

In the same part, the same mark is assigned, so the duplication explanation is omitted. In the following explanation, a user sets a condition on which the user stands in front of the compound apparatus, as a standard of position, direction and the like.

(First Embodiment)

Figure 1A:
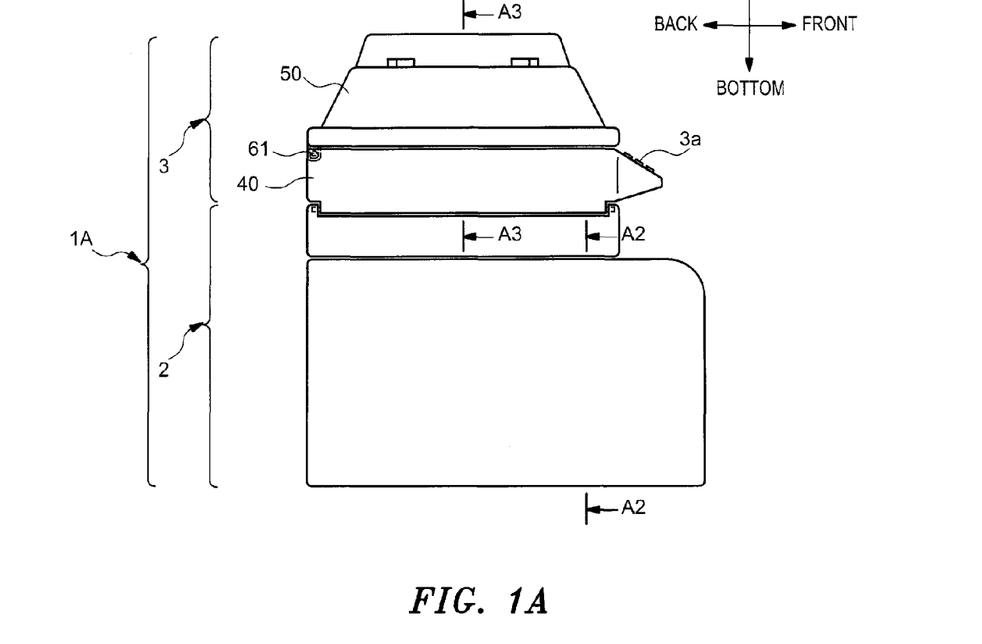
FIG. 1A is a left side diagram of a compound apparatus in the first embodiment of the present invention.
Figure 1B:
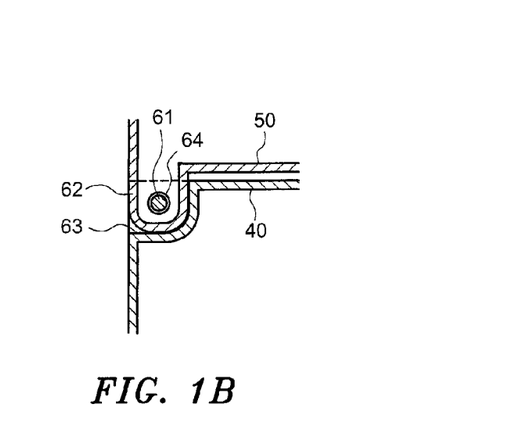
FIG. 1B is a part enlargement sectional diagram of a compound apparatus in the first embodiment of the present invention.
Figure 2A:
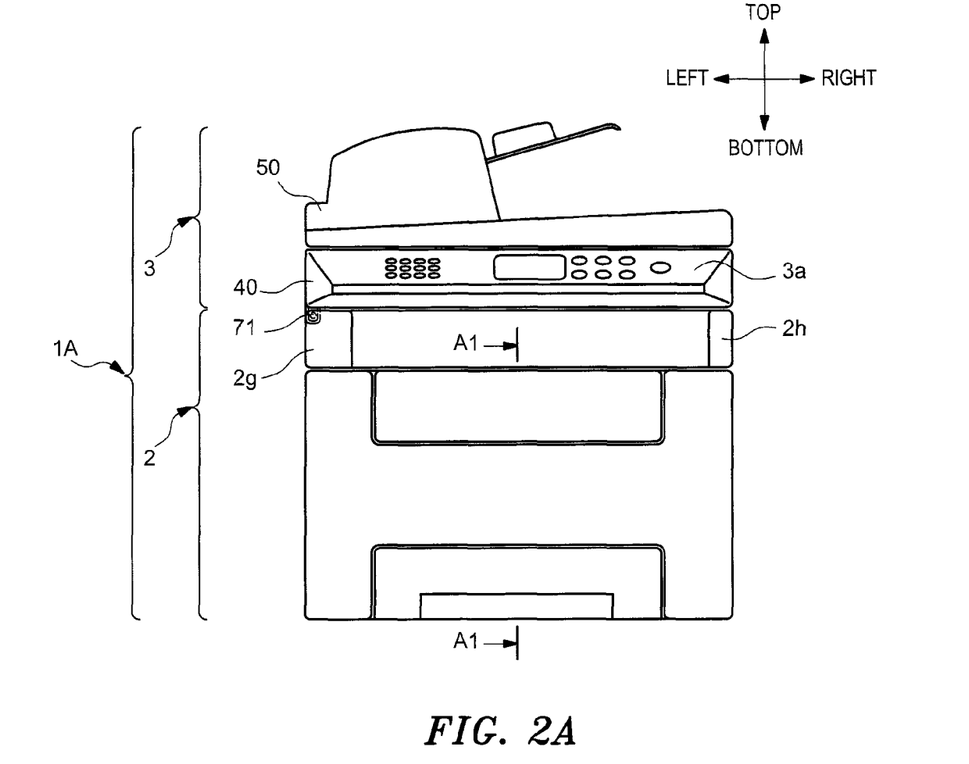
FIG. 2A is a front diagram of a compound apparatus in the first embodiment of the present invention.
Figure 2B:
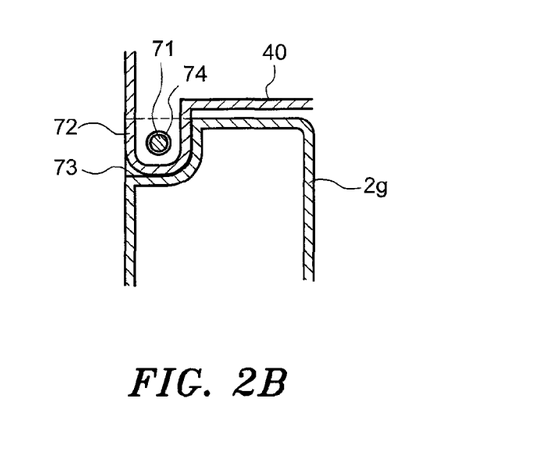
FIG. 2B is a part enlargement sectional diagram of a compound apparatus in the first embodiment of the present invention.
Figure 3:
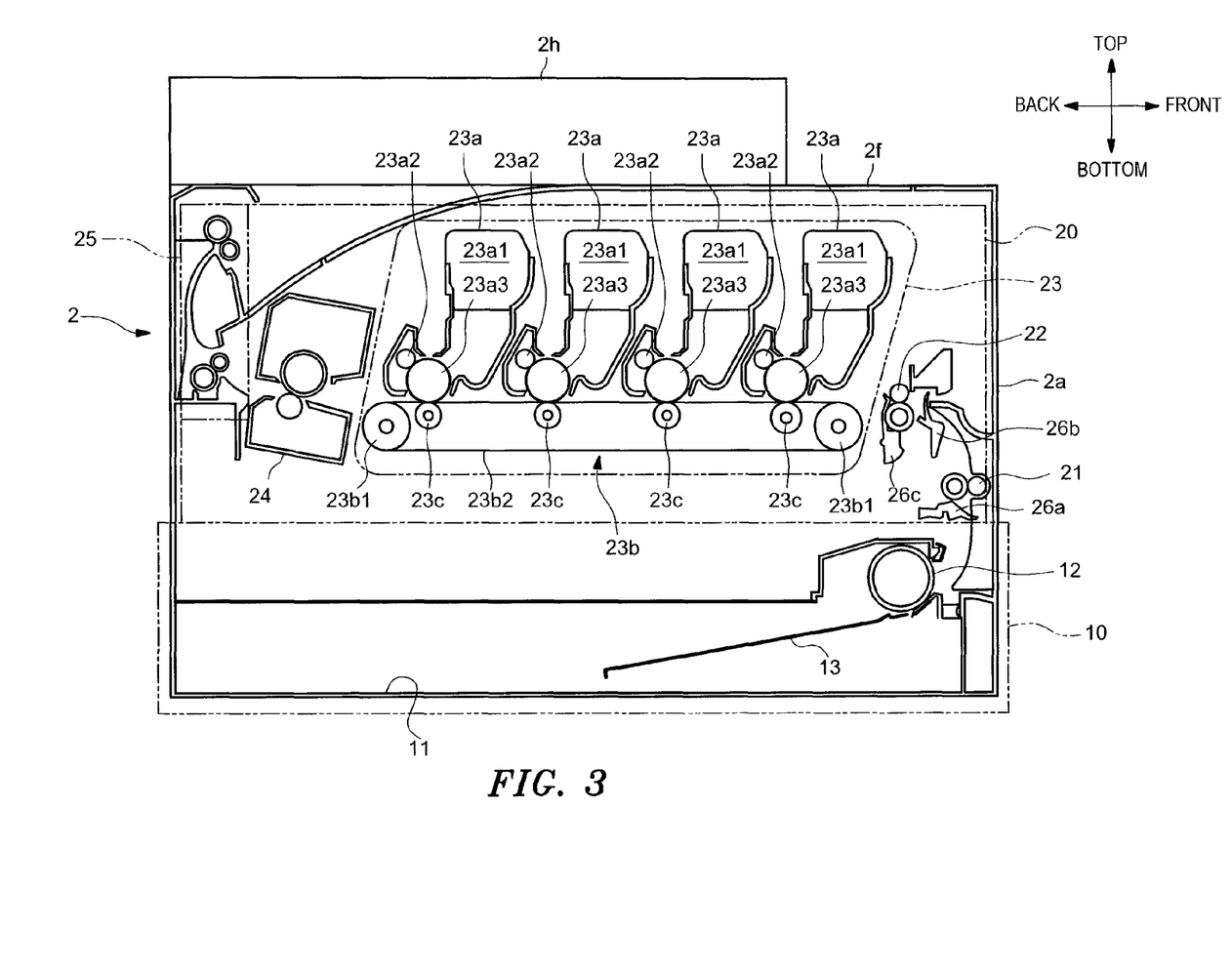
FIG. 3 is an A1-A1 sectional diagram of FIG. 2.
Figure 4:
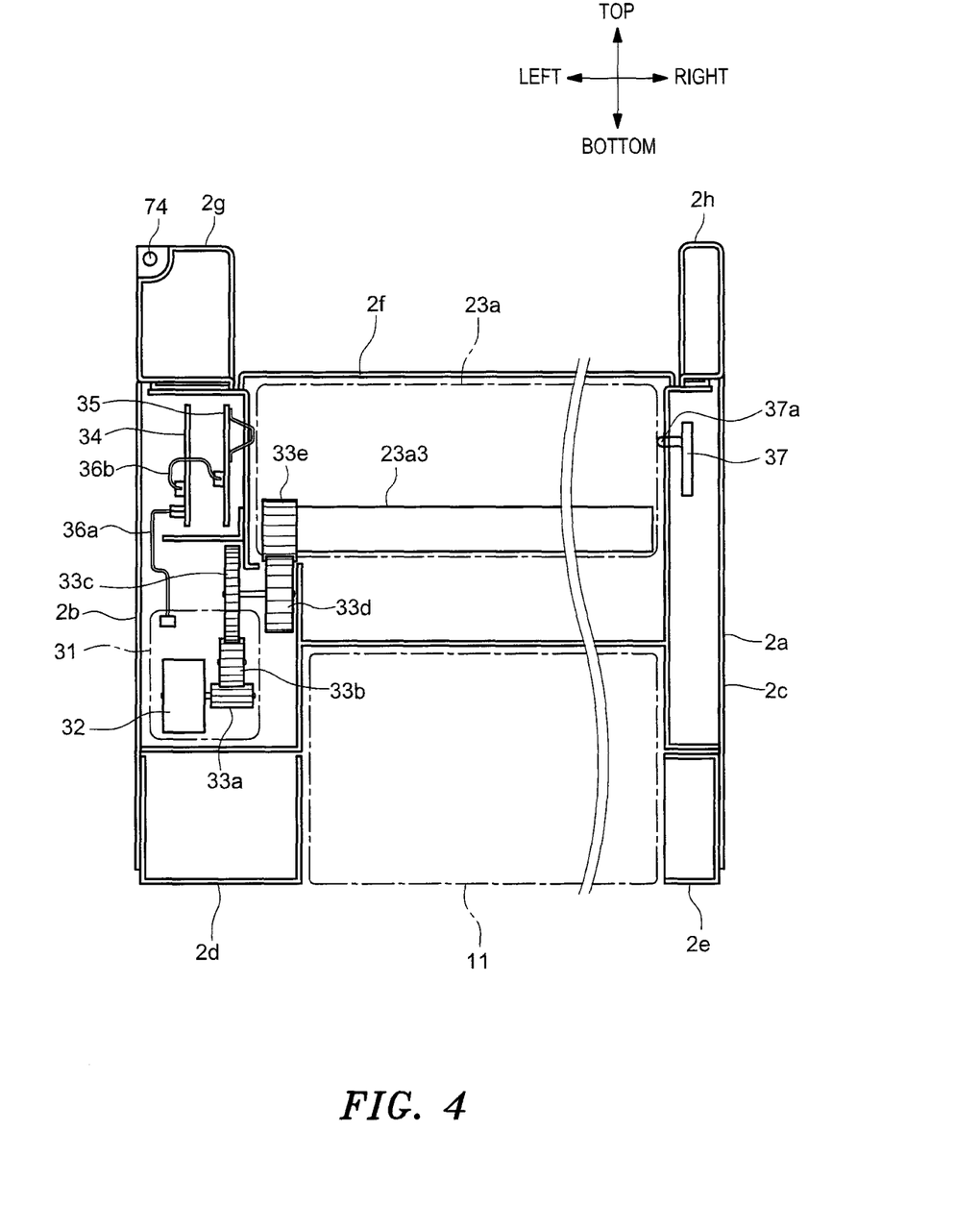
FIG. 4 is an A2-A2 sectional diagram of FIG. 1.
Figure 5:
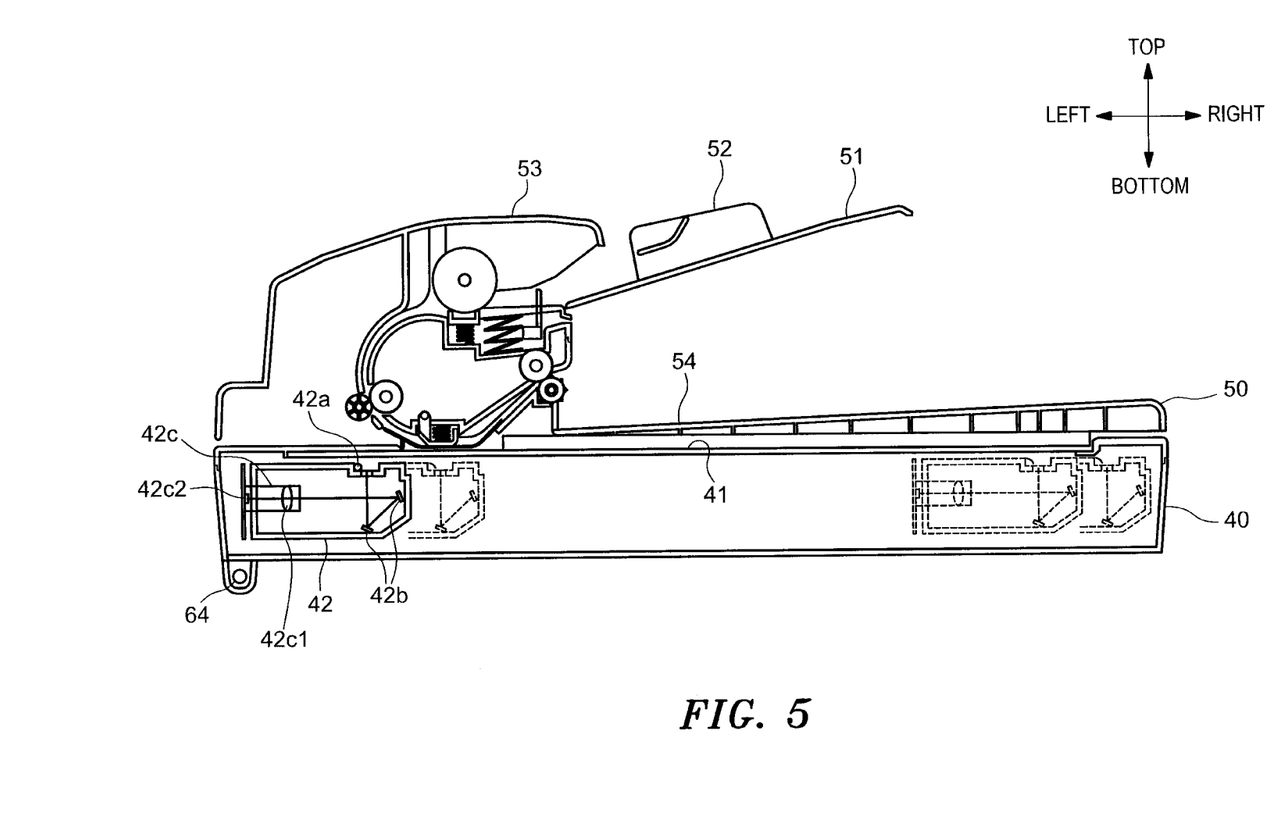
FIG. 5 is an A3-A3 sectional diagram of FIG. 1.
Figure 6A:
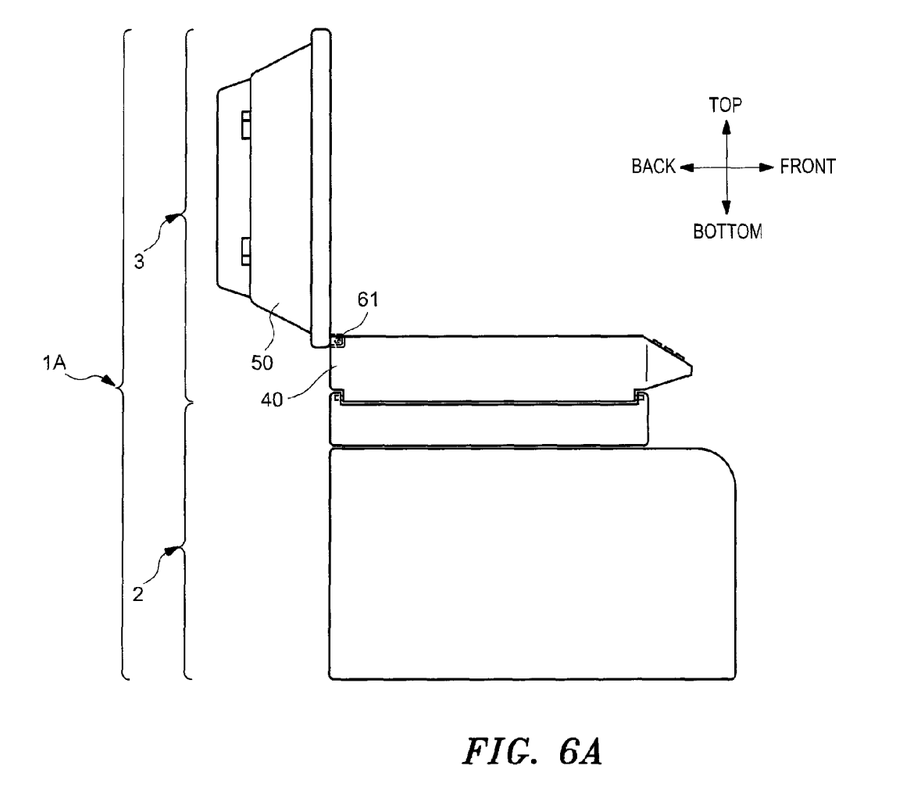
FIG. 6A is a left side diagram showing conditions of opening a document cover unit of a compound apparatus in the first embodiment of the present invention.
Figure 6B:
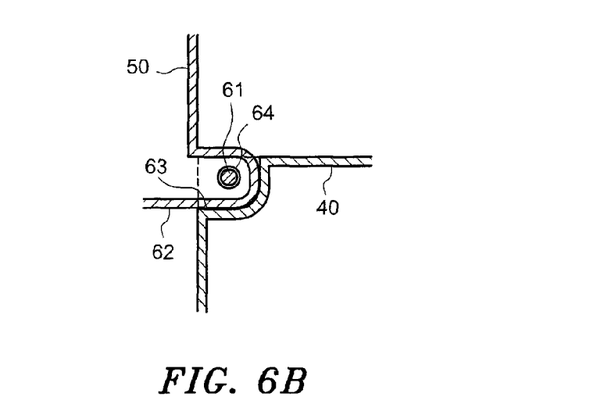
FIG. 6B is a part enlargement sectional diagram of FIG. 6A.
Figure 7A:
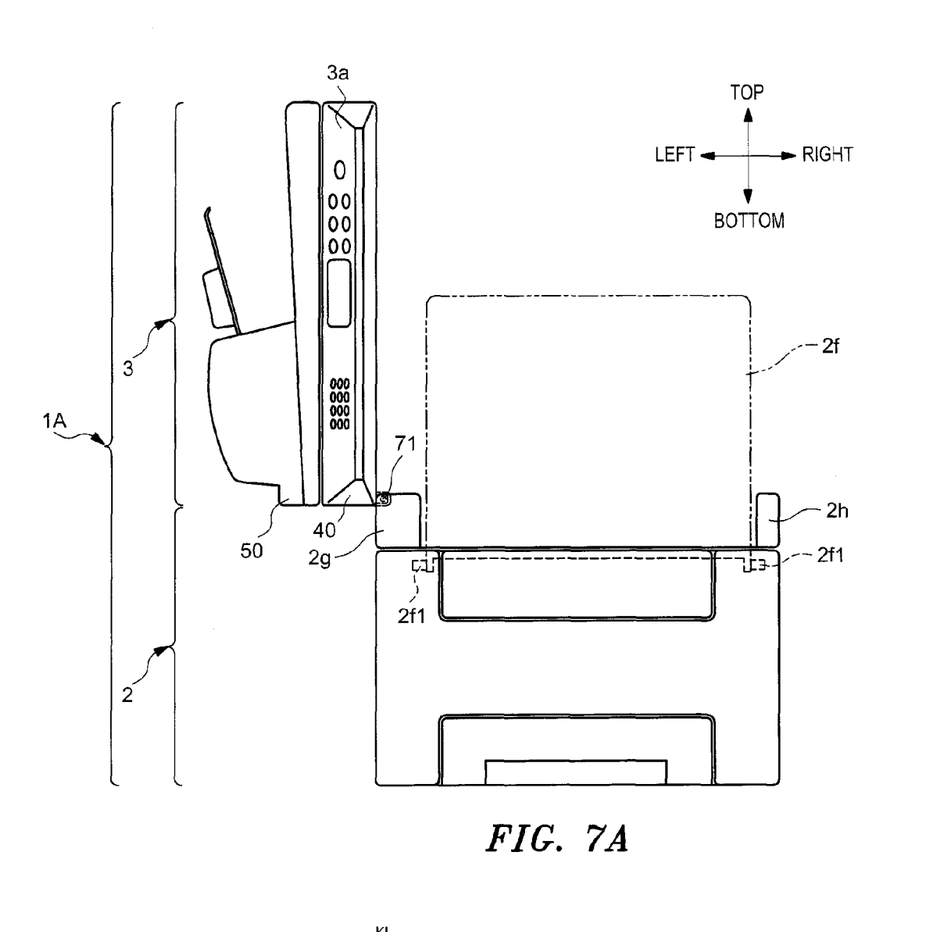
FIG. 7A is a front diagram showing conditions of opening a scanner section of a compound apparatus in the first embodiment of the present invention.
Figure 7B:
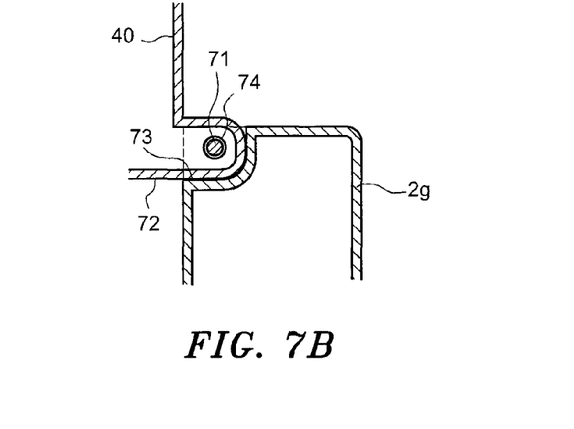
FIG. 7B is a part enlargement sectional diagram of FIG. 7A.
Figure 8:
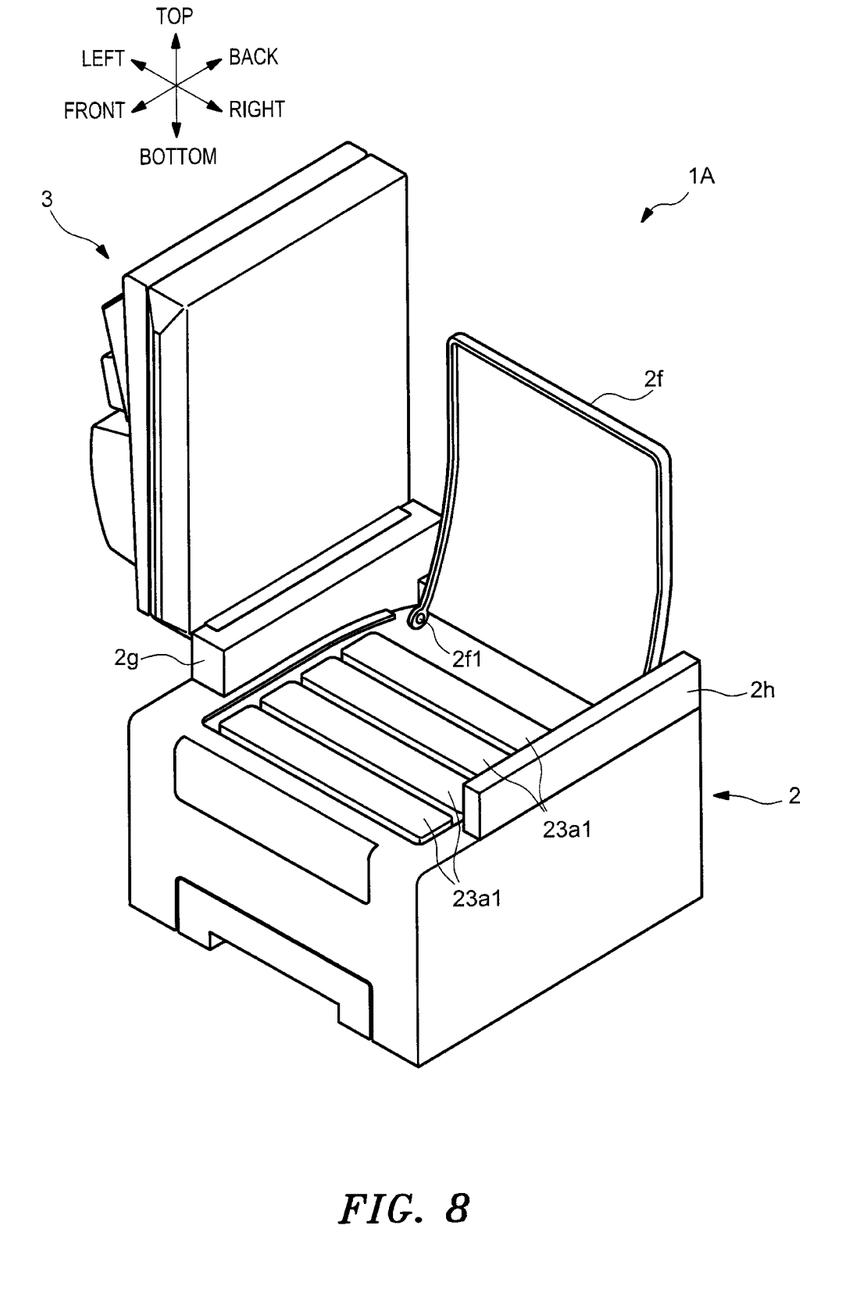
FIG. 8 is a diagram for explaining an operation example of a compound apparatus in the first embodiment of the present invention, and is a squint diagram showing a condition of opening a scanner section.

Firstly, it is to explain about a compound apparatus in the first embodiment of the present invention. FIGS. 1A and 1B show a compound apparatus in the first embodiment of the present invention; FIG. 1A is a left side diagram; FIG. 1B is a part enlargement sectional diagram. FIGS. 2A and 2B show a compound apparatus in the first embodiment of the present invention; FIG. 2A is a front diagram; FIG. 2B is a part enlargement sectional diagram. FIG. 3 is an A1-A1 sectional diagram of FIG. 2A. FIG. 4 is an A2-A2 sectional diagram of FIG. 1A. FIG. 5 is an A3-A3 sectional diagram of FIG. 1A. FIGS. 6A and 6B explain an operation example of a compound apparatus in the first embodiment of the present invention; FIG. 6A is a left side diagram showing conditions of opening a document cover unit; FIG. 6B is a part enlargement sectional diagram of FIG. 6A. FIGS. 7A and 7B explain an operation example of a compound apparatus in the first embodiment of the present invention; FIG. 7A is a front diagram showing conditions of opening a scanner section; FIG. 7B is a part enlargement sectional diagram of FIG. 7A. FIG. 8 is a diagram for explaining an operation example of a compound apparatus in the first embodiment of the present invention, and is a perspective diagram showing conditions of opening a scanner section.

As shown by FIG. 1A and FIG. 2A, a compound apparatus 1A is a copy machine that comprises a printer section 2 as an example of an image forming apparatus and a scanner section 3 as an example of a manuscript reading apparatus in the first embodiment of the present invention. In the following explanation, the printer section 2 records by forming images onto record paper through a LED tandem color method, but the printer section 2 may also record by forming images onto record paper through a laser, an ink jet method, a dot matrix impact method and the like.

<Printer Section 2>

As shown by FIG. 3, the printer section 2 forms an image onto record paper as an example of a record medium, and comprises a paper feeding section 10 and an image forming mechanism section 20.

<<Paper Feeding Section 10>>

The paper feeding section 10 is furnished capable of drawing out to the front with respect to a box body 2a of the printer section 2, and comprises a paper feeding cassette 11, a paper feeding roller 12 and a one-way clutch 13. The paper feeding cassette 11 accommodates record paper (not shown) into the inside; the paper feeding roller 12 feeds record paper to the image forming mechanism section 20 on the basis of a control of a control foundation board 34. The one-way clutch 13 conveys record paper from the paper feeding cassette 11 to the image forming mechanism section 20 in one direction.

<<Image Forming Mechanism Section 20>>

The image forming mechanism section 20 is a device that forms images by using well-known electrophotographic method onto record paper supplied from the paper feeding section 10, and is furnished on the top of the paper feeding section 10. The image forming mechanism section 20 comprises a registration roller 21, a conveying roller 22, an image forming unit 23, a fixing unit 24 and an ejecting unit 25 in an order from upstream side to downstream side in which record paper is conveyed.

The registration roller 21 is a roller that supplies an askew line correcting means that corrects askew line of record paper and conveys the corrected record paper to the down stream in a right direction. The conveying roller 22 is a roller that conveys record paper to the image forming unit 23.

The image forming unit 23 comprises a print process cartridge 23a, a conveying section 23b and a transfer roller 23c.

The print process cartridge 23a are furnished four corresponding to four kinds of toner, and includes a toner cartridge 23a1, a charge roller 23a2 and a photosensitive drum 23a3. The toner cartridge 23a1 accommodates toner, and supplies toner to the photosensitive drum 23a3. The charge roller 23a2 is a roller for charging the photosensitive drum 23a3. The photosensitive drum 23a3 is charged through the charge roller 23a2; and forms an electrostatic latent image on the surface of the photosensitive drum 23a3 by receiving LED light irradiated from a print head (not shown).

The conveying section 23b is furnished below the print process cartridge 23a, and includes a couple of conveying rollers 23b1, 23b1, and a conveying belt 23b2. The couple of conveying rollers 23b1, 23b1 are rollers for driving the conveying belt 23b2. The conveying belt 23b2 is an endless belt that is rolled around the couple of conveying rollers 23b1, 23b1, and conveys record paper.

The transfer roller 23c is furnished below the print process cartridge 23a, corresponding to the photosensitive drum 23a3. The transfer roller 23c transfers an electrostatic latent image formed on the surface of the photosensitive drum 23a3 to record paper.

The fixing unit 24 makes the electrostatic latent image transferred on record paper fix onto the record medium through heat and pressure. The ejecting unit 25 ejects record paper to the outside of the printer section 2, here, that is a top cover 2f (referring to FIG. 4) furnished so as to cover the open mouth of the box body 2a of the printer section 2.

Further, the image forming mechanism section 20 comprises a sensor 26a for detecting that record paper is supplied to the inside of the image forming mechanism section 20 through the paper feeding roller 12, a sensor 26b for detecting that record paper passes the registration roller 21, and a sensor 26c for detecting that record paper is supplied to the image forming unit 23. A detection result of the sensors 26a-26c is outputted to the control foundation board 34.

As shown by FIG. 4, the printer section 2 comprises an electric power source unit 31, a driving motor 32, gears 33a-

33e, a control foundation board 34, a high voltage foundation board 35, cables 36a and 36b at the left end part.

The electric power source unit 31 supplies electric power supplied from the outside to all kinds of equipment in a compound apparatus 1A. The driving motor 32 drives the photosensitive drum 23a3 rotate through the gears 33a-33e. The gears 33a-33e transmit driving power of the driving motor 32 through mutually meshing; the gear 33a is connected to the driving motor 32, and the gear 33e is connected to the photosensitive drum 23a3.

The control foundation board 34 outputs a control signal for controlling all kinds of equipment in the compound apparatus 1A. The high voltage foundation board 35 is a foundation board for assigning high voltage to the print process cartridge 23a. The electric power source unit 31, the control foundation board 34 and the high voltage foundation board 35 are connected electrically through the cables 36a and 36b.

Further, the printer section 2 comprises a toner sensor foundation board 37 at the right end part. The toner sensor foundation board 37 comprises a toner sensor 37a for detecting toner amount in the print process cartridge 23a. A detection result of the toner sensor 37a is outputted to the control foundation board 34.

Furthermore, the box body 2a of the printer section 2 comprises side covers 2b, 2c, cassette guides 2d, 2e, and a top cover 2f. The side covers 2b, 2c are members that forms left and right sides of the printer section 2 respectively; the cassette guides 2d, 2e are members for guiding the paper feeding cassette 11, furnished at the inside of the side covers 2b, 2c respectively.

The top cover 2f is furnished capable of rotating between a position that blocks an open mouth furnished on the top of the box body 2a and a position that opens an open mouth furnished on the top of the box body 2a through taking the rear of the box body 2a as rotation fulcrum axis of rotation. Here, the rotation fulcrum axis 2f1 is an axis that extends to the left and right directions of the box body 2a. Further, the top cover 2f is a record paper receiving section for receiving record paper ejected through the ejection unit 25 on the surface of the top cover 2f.

Further, the box body 2a of the printer section 2 comprises a couple of stays 2g, 2h on the upper part. The stay 2g is furnished at the left end part of the box body 2a, and comprises rotation fulcrum axis use ditch 74 for axially supporting the scanner section 3 capable of rotating. The stay 2h is furnished at the right end part of the box body 2b, and is contacted at the base of the right end part of the scanner section 3 in conditions that the scanner section 3 is closed.

The stay 2g has more thickness in left and right directions than the stay 2h in consideration of intensity. In the present embodiment, the electric power source unit 31, the driving motor 32, the gears 33a-33c, the control foundation board 34, the high voltage foundation board 35 and the cables 36a, 36b, are furnished below the rotation fulcrum axis 71 (referring to FIGS. 2A and 2B), in the present embodiment, below the stay 2g in which the rotation fulcrum axis 71 is furnished. According to such furnishings structure, the compound apparatus 1A can put space of the width direction to practical use effectively with securing intensity of the stay 2g.

<Scanner Section 3>

The scanner section 3 is furnished on the printer section 2. As shown by FIG. 5, the scanner section 3 includes a flat bed unit 40 that is an example of a manuscript reading section, and a document cover unit 50 that is an example of a manuscript holding section. Further, an operation panel 3a is furnished in front of the flat bed unit 40. An input through operating the operation panel 3a by a user is outputted to the control foundation board 34.

The flat bed unit 40 includes a manuscript loading surface 41 and a carriage 42. The manuscript loading surface 41 is a surface for loading a manuscript (not shown) in order to read. The carriage 42 reads a manuscript loaded on the manuscript loading surface 41 while moving back and forth in a sub-scanning line direction. The carriage 42 comprises a cold cathode fluorescent lamp 42a, mirrors 42b, 42b, and an image sensor unit 42c.

The cold cathode fluorescent lamp 42a is a light source that irradiates light for reading a manuscript. The mirrors 42b, 42b make light irradiated from the cold cathode fluorescent lamp 42a reflect in a fixed angle, and makes it incident into the image sensor unit 42c. The cold cathode fluorescent lamp 42a, the mirrors 42b, 42b and the image sensor unit 42c are furnished so that the light path length of light becomes a fixed length.

The image sensor unit 42c includes a lens 42c1 for condensing rays of the incident light, and a CCD image sensor 42c2 that outputs the condensed light to the control foundation board 34 by changing it into digital signals. The control foundation board 34 can drive the printer section 2 on the basis of the digital signals outputted from the CCD image sensor 42c2 to form an image on record paper. Moreover, a contact image sensor can be also adopted as the image sensor unit 42c by replacing the lens 42c1 and the CCD image sensor 42c2.

The document cover unit 50 is a manuscript holding section for holding a manuscript loaded on the manuscript loading surface 41 down through the base of the document cover unit, and includes a manuscript tray 51, a manuscript width guide 52, an automatic manuscript conveying apparatus 53 and a manuscript reception 54.

The manuscript tray 51 is a tray for loading a plurality of sheets of manuscripts. The manuscript width guides 52 are guides for preventing askew line of a manuscript when the manuscript is conveyed through making the manuscript loaded in the manuscript tray 51 line up on a width direction, and are furnished in a couple on the width direction of the manuscript. The automatic manuscript conveying apparatus 53 conveys manuscripts loaded in a manuscript tray to the manuscript loading surface 41 every one sheet. The manuscript reception 54 is a member for receiving manuscripts conveyed by the automatic manuscript conveying apparatus 53.

<Rotation Operation of the Document Cover Unit 50>

Here, it is to explain about an operation that drives the document cover unit 50 rotate with respect to the flat bed unit 40 by referring to FIGS. 1A, 1B, 6A and 6B. Here, FIG. 1A is a left side diagram showing conditions of closing a document cover unit; FIG. 1B is a part enlargement sectional diagram; FIG. 6A is a left side diagram showing conditions of opening a document cover unit; and FIG. 6B is a part enlargement sectional diagram of the FIG. 6A.

As shown by FIG. 1A and 1B, the document cover unit 50 is axially supported capable of rotating with respect to the rear of the flat bed unit 40 through a rotation fulcrum axis 61 that extends to the left and right directions. In the present embodiment, the rotation fulcrum axis 61 is fixed with respect to the document cover unit 50, and is supported capable of rotating by being inserted into a rotation fulcrum axis use ditch 64 furnished in the flat bed unit 40. Then, as shown by FIG. 1A and FIG. 1B, in conditions of closing the document cover unit 50, the compound apparatus 1A can read a manuscript through conveying the manuscript to the manuscript loading surface 41 by using the automatic manuscript conveying apparatus 53.

Then, in conditions of opening the document cover unit 50 as shown by FIG. 6A, a stopper wall 62 furnished in the document cover unit 50 and a stopper wall 63 furnished in the flat bed unit 40 are contacted as shown by FIG. 6B, consequently the rotation region of the document cover unit 50 is regulated within 90 degrees (from parallel to verticality with respect to the flat bed unit 40). Like this, in conditions of opening the document cover unit 50, the compound apparatus 1A becomes possible to load a manuscript on the manuscript loading surface 41.

<Rotation Operation of the Scanner Section 3>

Continuously, it is to explain about an operation that drives the scanner section 3 rotate with respect to the printer section 2 by referring to FIGS. 2A, 2B, 7A, 7B and 8. Here, FIG. 2A is a front diagram showing conditions of closing a scanner section; FIG. 2B is a part enlargement sectional diagram of FIG. 2A; FIG. 7A is a front diagram showing conditions of opening a scanner section; FIG. 7B is a part enlargement sectional diagram of the FIG. 7A; and FIG. 8 is a perspective diagram showing conditions of opening a scanner section.

As shown by FIG. 2A and FIG. 2B, the scanner section 3 is axially supported capable of rotating with respect to the left end part of the printer section 2 (stay 2g) through a rotation fulcrum axis 71 that extends to the front and back directions. In the present embodiment, the rotation fulcrum axis 71 is fixed with respect to the scanner section 3, and is supported capable of rotating by being inserted into a rotation fulcrum axis use ditch 74 furnished in the stay 2g.

Then, in conditions of opening the seamier section 3 as shown by FIG. 7A, a stopper wall 72 furnished in the flat bed unit 40 and a stopper wall 73 furnished in the stay 2g are contacted as shown by FIG. 7B, consequently the rotation region of the scanner section 3 is regulated within 90 degrees (from parallel to verticality with respect to the printer section 2). Like this, in conditions of opening the scanner section 3, as shown by FIG. 8, it becomes possible to access from the upper open mouth of the box body 2a to the image forming mechanism section 20 of the compound apparatus 1A through driving the top cover 2f rotate, and the inside maintenance and the expendable article (print process cartridge 23a) change of the image forming mechanism section 20 becomes possible.

In the present embodiment, because the rotation fulcrum axis 71 of the scanner section 3 is furnished on the left side of the image forming mechanism section 20 and the scanner section 3 can rotate to a position that becomes vertical (perpendicular) with respect to the printer section 2, the scanner section 3 does not disturb an open operation of the top cover 2f. Further, because the automatic manuscript conveying apparatus 53 is furnished on the side of the rotation fulcrum axis 71, the position of the center of gravity of the scanner section 3 becomes near the rotation fulcrum axis 71. For this reason, the load moment surrounding the rotation fulcrum axis 71 of the scanner section 3 becomes small, and the operation function is improved.

Further, in the present embodiment, because the rotation fulcrum axis 71 is furnished on the left side of the compound apparatus 1A, in conditions of opening the scanner section 3, a wide space appears on the right hand side of a user, and it becomes easy to perform the operations of the inside maintenance and the expendable article change. Further, in the compound apparatus 1A of the present embodiment, even in conditions of opening the scanner section 3, the operation panel 3a faces the user side, therefore, it is possible to operate the operation panel 3a.

(Second Embodiment)

Figure 9A:
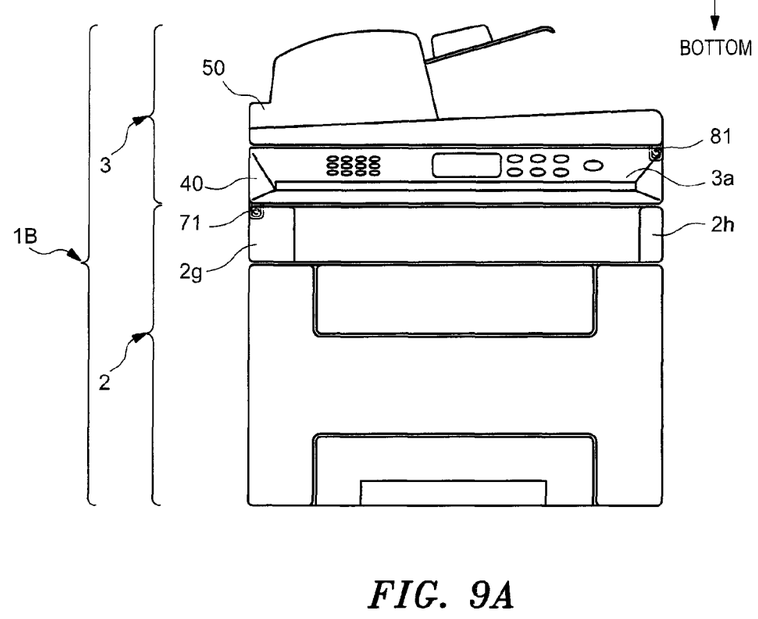
FIG. 9A is a front diagram of a compound apparatus in the second embodiment of the present invention.
Figure 9B:
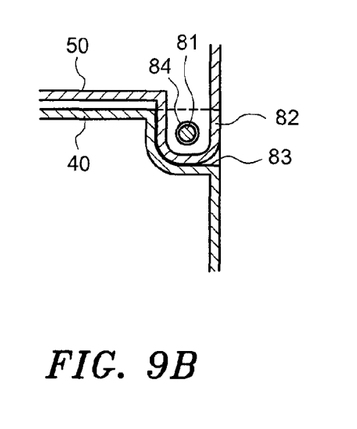
FIG. 9B and FIG. 9C are part enlargement sectional diagrams of FIG. 9A.
Figure 9C:
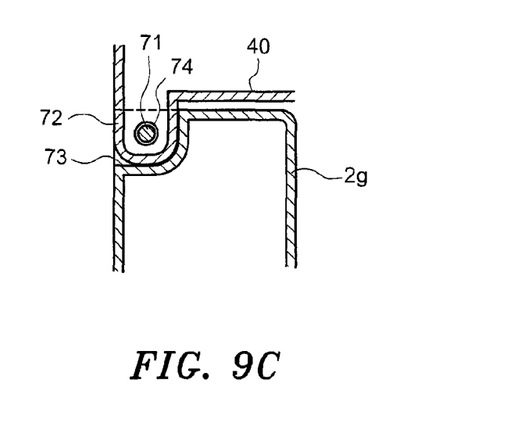
Figure 10A:
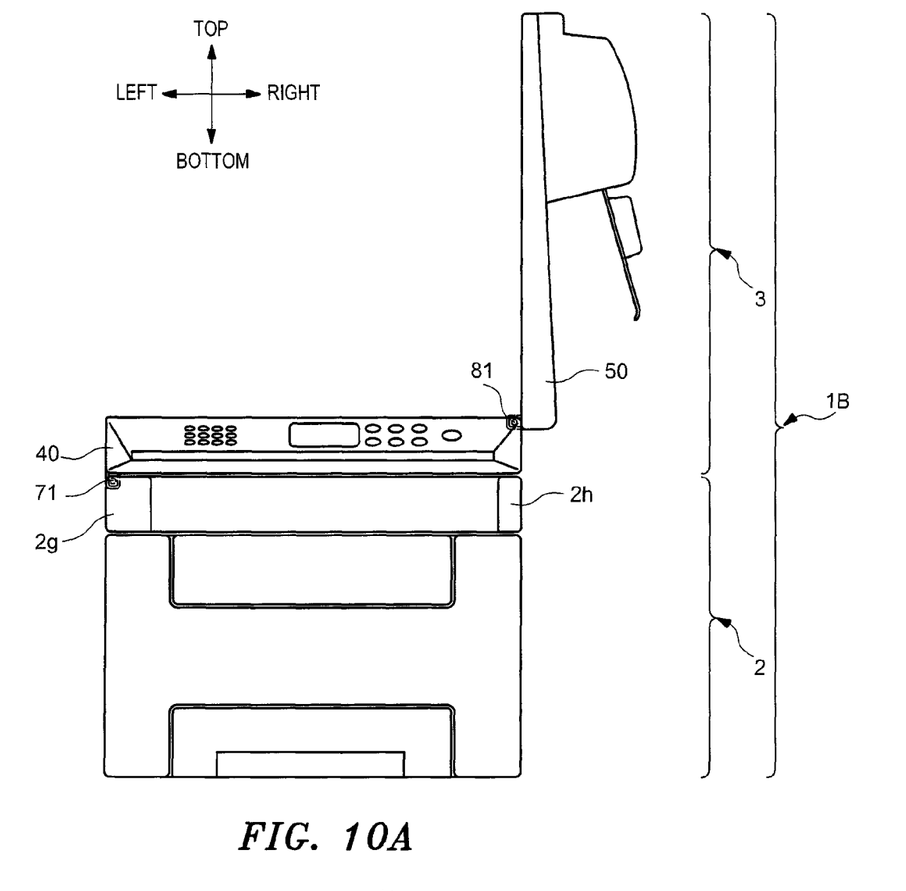
FIG. 10A is a front diagram showing a condition of opening a document cover unit of a compound apparatus in the second embodiment of the present invention.
Figure 10B:
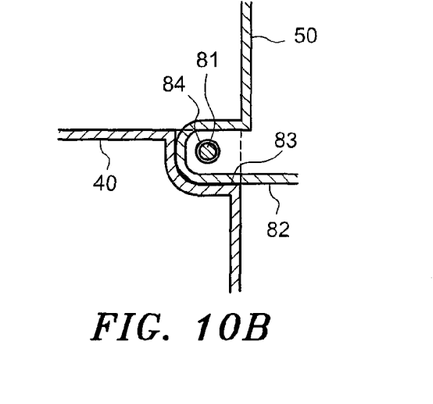
FIG. 10B is a part enlargement sectional diagram of the FIG. 10A.
Figure 11A:
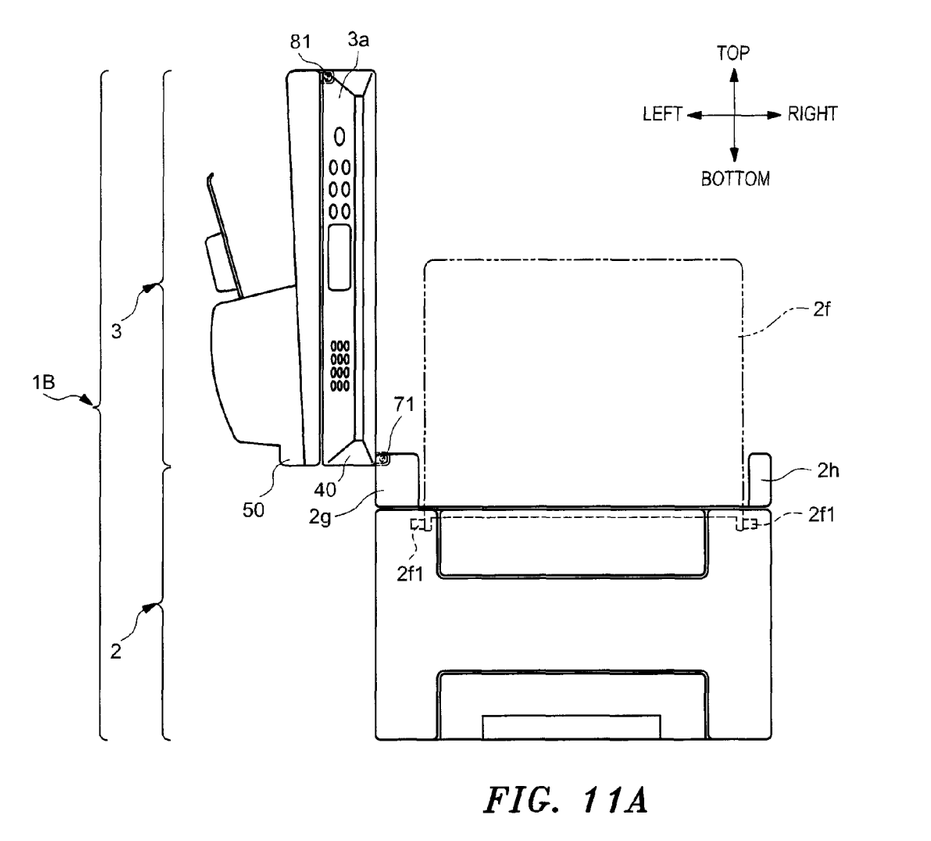
FIG. 11A is a front diagram showing conditions of opening a scanner section of a compound apparatus in the second embodiment of the present invention.
Figure 11B:
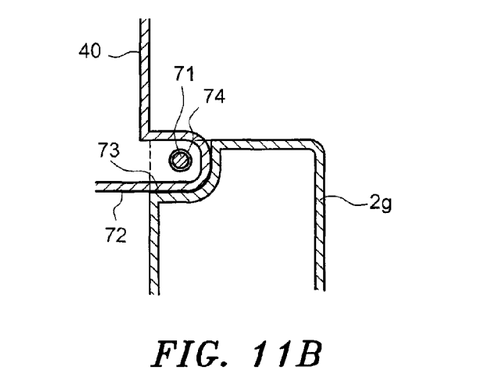
FIG. 11B is a part enlargement sectional diagram of the FIG. 11A.

Continuously, it is to explain about a compound apparatus in the second embodiment of the present invention that regards a different point with the compound apparatus 1A in the first embodiment as a center by referring to FIGS. 9A, 9B, 9C, 10A, 10B, 11A, and 11B. FIGS. 9A-9C show a compound apparatus in the second embodiment of the present invention; FIG. 9A is a front diagram; FIG. 9B and FIG. 9C are part enlargement sectional diagrams of FIG. 9A; FIGS. 10A and 10B explain an operation example of a compound apparatus in the second embodiment of the present invention; FIG. 10A is a front diagram showing conditions of opening a document cover unit; FIG. 10B is a part enlargement sectional diagram of FIG. 10A; FIGS. 11A and 11B explain an operation example of a compound apparatus in the second embodiment of the present invention; FIG. 11A is a front diagram showing conditions of opening a scanner section; and FIG. 11B is a part enlargement sectional diagram of FIG. 11A.

<Rotation Operation of the Document Cover Unit 50>

Firstly, it is to explain about an operation that drives the document cover unit 50 rotate with respect to the flat bed unit 40 by referring to FIG. 9 and FIG. 10. Here, FIG. 9A is a front diagram showing conditions of closing a document cover unit; FIG. 9B is a part enlargement sectional diagram of FIG. 9A; FIG. 10A is a front diagram showing conditions of opening a document cover unit; and FIG. 10B is a part enlargement sectional diagram of FIG. 10A.

In a compound apparatus 1B of the second embodiment, as shown by FIG. 9A and FIG. 9B, the document cover unit 50 is axially supported capable of rotating with respect to the right end side of the flat bed unit 40 through a rotation fulcrum axis 81 that extends to the front and back directions by replacing the rotation fulcrum axis 61 of the first embodiment. In the present embodiment, the rotation fulcrum axis 81 is fixed with respect to the document cover unit 50, and is supported capable of rotating by being inserted into a rotation fulcrum axis use ditch 84 furnished in the flat bed unit 40. Then, as shown by FIG. 9A and 9B, in conditions of closing the document cover unit 50, the compound apparatus 1B can read a manuscript through conveying the manuscript to the manuscript loading surface 41 by using the automatic manuscript conveying apparatus 53.

Then, in conditions of opening the document cover unit 50 as shown by FIG. 10A, a stopper wall 82 furnished in the document cover unit 50 and a stopper wall 83 furnished in the flat bed unit 40 are contacted as shown by FIG. 10B, consequently the rotation region of the document cover unit 50 is regulated within 90 degrees (from parallel to verticality with respect to the flat bed unit 40). Like this, in conditions of opening the document cover unit 50, it becomes possible to load a manuscript on the manuscript loading surface 41 in the compound apparatus 1B.

<Rotation Operation of the Scanner Section 3>

Continuously, it is to explain about an operation that drives the scanner section 3 rotate with respect to the printer section 2 by referring to FIGS. 9A, 9B, 10A & 10B. Here, FIG. 9A is a front diagram showing conditions of closing a scanner section; FIG. 9C is a part enlargement sectional diagram of FIG. 9A; FIG. 11A is a front diagram showing conditions of opening a scanner section; and FIG. 11B is a part enlargement sectional diagram of FIG. 11A.

In the compound apparatus 1B of the second embodiment, as shown by FIG. 9A and FIG. 9B, the scanner section 3 is axially supported capable of rotating with respect to the left end part of the printer section 2 (stay 2g) through the rotation fulcrum axis 71 that extends to the front and back directions.

Then, in conditions of opening the scanner section 3 as shown by FIG. 11A, the stopper wall 72 furnished in the flat bed unit 40 and the stopper wall 73 furnished in the stay 2g are contacted as shown by FIG. 11B, the rotation region of the scanner section 3 is regulated within 90 degrees (from parallel to verticality with respect to the printer section 2).

In the compound apparatus 1B of the present embodiment, because the rotation fulcrum axis 71 of the scanner section 3 and the rotation fulcrum axis 81 of the document cover unit 50 are respectively furnished opposite to the left and right sides, it becomes possible to open the scanner section with preventing that the document cover unit 50 is unnecessarily opened. Therefore, it is possible to abolish any rotation regulation member for regulating unnecessary rotations of the document cover unit 50.

The above is to explain about the embodiment of the present invention, but the present invention is not limited to the foregoing embodiments but many modifications and variations are possible within the spirit and scope of the appended claims of the invention. For example, in the case to apply the present invention to a monochrome copy machine, it is possible to serve the print process cartridge 23a and the transfer roller 23c as one. Further, it is also possible to change the shape of the top cover 2f and the shape of the rotation fulcrum axes 61, 71 and 81 suitably. Furthermore, the compound apparatus of the present invention is not limited to the copy machine, but it is also possible to apply to a facsimile, an office use compound machine (MFP: Multi Function Products) and the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A compound apparatus that comprises an image forming apparatus for forming an image onto a record medium and a manuscript reading apparatus furnished in the image forming apparatus for reading out a manuscript, wherein the image forming apparatus comprises a box body section that has an open mouth on the top; and an image forming mechanism section that is furnished in the box body section, the manuscript reading apparatus is supported capable of rotating between a position that blocks the open mouth and a position that opens the open mouth through a rotation fulcrum axis that is furnished on the left end part or the right end part of the image forming apparatus and that extends to the front and back directions, wherein the rotation fulcrum axis is furnished in a stay that is furnished on the top of the box body section; and
    a cover capable of rotating between a position that blocks the open mouth of the box body section and a position that opens the open mouth of the box body section through a rotation fulcrum axis that is furnished on the rear of the box body section and that extends to left and right directions.

2. The compound apparatus according to claim 1, wherein the rotation fulcrum axis of the manuscript reading apparatus is furnished in the outside of the open mouth.

3. The compound apparatus according to claim 2, wherein a control foundation board, that controls an electric power source unit for supplying electric power to the image forming mechanism section, a driving motor for driving the image forming mechanism section and the image forming mechanism section, is furnished below the rotation fulcrum axis.

4. The compound apparatus according to claim 2, wherein the manuscript reading apparatus, further comprising:
    a manuscript reading section that is supported capable of rotating with respect to the image forming apparatus and that has a manuscript loading surface for reading out the manuscript; and
    a manuscript holding section that is furnished on the manuscript reading section and that holds the manuscript loaded on the manuscript loading surface down, wherein the manuscript holding section is supported capable of rotating between a position that holds the manuscript down by covering the manuscript loading surface and a position that opens the manuscript loading surface through a rotation fulcrum axis that is furnished on the right end part or the left end part of the manuscript reading section and that extends to the front and back directions, and
    the rotation fulcrum axis of the manuscript reading section and the rotation fulcrum axis of the manuscript holding section are respectively furnished opposite sides of the left and right.

5. The compound apparatus according to claim 1, wherein a control foundation board, that controls an electric power source unit for supplying electric power to the image forming mechanism section, a driving motor for driving the image forming mechanism section and the image forming mechanism section, is furnished below the rotation fulcrum axis.

6. The compound apparatus according to claim 5, wherein the manuscript reading apparatus, further comprising:
    a manuscript reading section that is supported capable of rotating with respect to the image forming apparatus and that has a manuscript loading surface for reading out the manuscript; and
    a manuscript holding section that is furnished on the manuscript reading section and that holds the manuscript loaded on the manuscript loading surface down,
    wherein the manuscript holding section is supported capable of rotating between a position that holds the manuscript down by covering the manuscript loading surface and a position that opens the manuscript loading surface through a rotation fulcrum axis that is furnished on the right end part or the left end part of the manuscript reading section and that extends to the front and back directions, and
    the rotation fulcrum axis of the manuscript reading section and the rotation fulcrum axis of the manuscript holding section are respectively furnished opposite sides of the left and right.

7. The compound apparatus according to claim 1, wherein the manuscript reading apparatus, further comprising:
    a manuscript reading section that is supported capable of rotating with respect to the image forming apparatus and that has a manuscript loading surface for reading out the manuscript; and
    a manuscript holding section that is furnished on the manuscript reading section and that holds the manuscript loaded on the manuscript loading surface down,
    wherein the manuscript holding section is supported capable of rotating between a position that holds the manuscript down by covering the manuscript loading surface and a position that opens the manuscript loading surface through a rotation fulcrum axis that is furnished on the right end part or the left end part of the manuscript reading section and that extends to the front and back directions, and the rotation fulcrum axis of the manuscript reading section and the rotation fulcrum axis of the manuscript holding section are respectively furnished opposite sides of the left and right.

8. The compound apparatus according to claim 1, further comprising:
a first stopper equipped with the stay; and
a second stopper equipped with the manuscript reading apparatus, a movable range of rotation of the manuscript reading apparatus is regulated within ninety degrees) (90°) since the first and second stays come into contact with each other.

9. The compound apparatus according to claim 1, wherein the stay is furnished asymmetrically from the view of a user who faces a front of the compound apparatus.

10. The compound apparatus according to claim 9, further comprising:
a first stopper equipped with the stay; and
a second stopper equipped with the manuscript reading apparatus, a movable range of rotation of the manuscript reading apparatus is regulated within ninety degrees) (90°) since the first and second stays come into contact with each other.

11. A compound apparatus that comprises an image forming apparatus for forming an image onto a record medium and a manuscript reading apparatus furnished in the image forming apparatus for reading out a manuscript, wherein the image forming apparatus comprises a box body section that has an open mouth on the top; and
an image forming mechanism section that is furnished in the box body section, the manuscript reading apparatus is supported capable of rotating between a position that blocks the open mouth and a position that opens the open mouth through a rotation fulcrum axis that is furnished on the left end part or the right end part of the image forming apparatus and that extends to the front and back directions, wherein the manuscript reading apparatus, further comprises:
a manuscript reading section that is supported capable of rotating with respect to the image forming apparatus and that has a manuscript loading surface for reading out the manuscript; and
a manuscript holding section that is furnished on the manuscript reading section and that holds the manuscript loaded on the manuscript loading surface down, wherein the manuscript holding section is supported capable of rotating between a position that holds the manuscript down by covering the manuscript loading surface and a position that opens the manuscript loading surface through a rotation fulcrum axis that is furnished on the right end part or the left end part of the manuscript reading section and that extends to the front and back directions, and the rotation fulcrum axis of the manuscript reading section and the rotation fulcrum axis of the manuscript holding section are respectively furnished opposite sides of the left and right.

12. The compound apparatus according to claim 11, further comprising:
a stay furnished on a top of the box body section, the stay furnished asymmetrically from the view of a user who faces a front of the compound apparatus.

13. The compound apparatus according to claim 12, further comprising:
a first stopper equipped with the stay; and
a second stopper equipped with the manuscript reading apparatus, a movable range of rotation of the manuscript reading apparatus is regulated within ninety degrees) (90°) since the first and second stays come into contact with each other.

14. A compound apparatus that comprises an image forming apparatus for forming an image onto a record medium, and a manuscript reading apparatus furnished in the image forming apparatus for reading out a manuscript, and a control panel, wherein the image forming apparatus comprises a box body section that has an open mouth on the top;
an image forming mechanism section that is furnished in the box body section; and
the manuscript reading apparatus is furnished on the right end part or left end part of the image forming apparatus seen from the user who faces to the control panel and supported capable of rotating between a position that blocks the open mouth and a position that opens the open mouth through a rotation fulcrum axis that extends to the front and back directions seen from the user who faces to the control panel.

15. The compound apparatus according to claim 14, further comprising:
a stay furnished on a top of the box body section, the stay furnished asymmetrically from the view of a user who faces a front of the compound apparatus.

16. The compound apparatus according to claim 15, further comprising:
a first stopper equipped with the stay; and
a second stopper equipped with the manuscript reading apparatus, a movable range of rotation of the manuscript reading apparatus is regulated within ninety degrees) (90°) since the first and second stays come into contact with each other.

17. A compound apparatus that comprises an image forming apparatus for forming an image onto a record medium, and a manuscript reading apparatus furnished in the image forming apparatus for reading out a manuscript, wherein the image forming apparatus comprises a box body section that has an open mouth on the top;
an image forming mechanism section that is furnished in the box body section;
a cover capable of rotating between a position that blocks the open mouth of the box body section and a position that opens the open mouth of the box body section through a rotation fulcrum axis that is furnished on the rear of the box body section and that extends to left and right directions; and
wherein the manuscript reading apparatus is supported capable of rotating between a position that blocks the open mouth and a position that opens the open mouth through a rotation fulcrum axis that is furnished on the right end part or left end part of the image forming apparatus and that extends to the front and back directions.

18. The compound apparatus according to claim 17, further comprising:
a stay furnished on a top of the box body section, the stay furnished asymmetrically from the view of a user who faces a front of the compound apparatus.

19. The compound apparatus according to claim 18, further comprising:
a first stopper equipped with the stay; and
a second stopper equipped with the manuscript reading apparatus, a movable range of rotation of the manuscript reading apparatus is regulated within ninety degrees) (90°) since the first and second stays come into contact with each other.

20. A compound apparatus that comprises an image forming apparatus for forming an image onto a record medium, and
a unit furnished in the upper part of the image forming apparatus, the image forming apparatus comprises a box body section;
an image forming mechanism section that is furnished in the box body section; and
an ejecting unit that ejects the record medium with a formed image, wherein the unit is supported capable of rotating through a rotation fulcrum axis that extends to the same direction as the record medium ejection of the ejecting unit.

21. The compound apparatus according to claim 20, further comprising:
an operation panel placed on a side of the unit.

22. The compound apparatus according to claim 21, further comprising:
a stay furnished on a top of the box body section, the stay furnished asymmetrically from the view of a user who faces the operation panel.

* * * * *